United States Patent
Zerbe

(10) Patent No.: US 8,514,952 B2
(45) Date of Patent: Aug. 20, 2013

(54) HIGH-SPEED SOURCE-SYNCHRONOUS SIGNALING

(75) Inventor: Jared Zerbe, Woodside, CA (US)

(73) Assignee: Rambus Inc., Sunnyvale, CA (US)

( * ) Notice: Subject to any disclaimer, the term of this patent is extended or adjusted under 35 U.S.C. 154(b) by 136 days.

(21) Appl. No.: 12/868,571

(22) Filed: Aug. 25, 2010

(65) Prior Publication Data

US 2010/0315142 A1 Dec. 16, 2010

Related U.S. Application Data

(63) Continuation of application No. PCT/US2009/042044, filed on Apr. 29, 2009.

(60) Provisional application No. 61/049,851, filed on May 2, 2008.

(51) Int. Cl.
*H04L 25/03* (2006.01)

(52) U.S. Cl.
USPC .......................................................... 375/257

(58) Field of Classification Search
USPC ................... 327/51, 175, 161, 557, 155, 158, 327/295, 336; 365/193, 194; 375/316, 354, 375/355, 376, 224, 295, 356, 362, 371; 711/167; 714/744, 699, 700; 326/21, 93; 370/503, 508, 517
See application file for complete search history.

(56) References Cited

U.S. PATENT DOCUMENTS

| | | | |
|---|---|---|---|
| 6,597,202 B1 * | 7/2003 | McCall et al. | 326/93 |
| 6,965,262 B2 * | 11/2005 | Zerbe | 327/336 |
| 7,012,956 B1 * | 3/2006 | Thomsen et al. | 375/224 |
| 2003/0081709 A1 * | 5/2003 | Ngo et al. | 375/362 |
| 2004/0123207 A1 | 6/2004 | Zumkehr | |
| 2004/0223566 A1 * | 11/2004 | Yamashita | 375/354 |
| 2005/0128826 A1 | 6/2005 | Kwack | |
| 2006/0164909 A1 | 7/2006 | Gower | |
| 2006/0181320 A1 | 8/2006 | Dreps | |
| 2007/0008791 A1 | 1/2007 | Butt | |
| 2008/0080647 A1 | 4/2008 | Altmann | |
| 2009/0174455 A1 * | 7/2009 | Dimitriu et al. | 327/295 |

* cited by examiner

Primary Examiner — Sam K Ahn
Assistant Examiner — Shawkat M Ali

(57) ABSTRACT

A system for communicating data between a first integrated circuit device and a second integrated circuit device is described. During operation, the first integrated circuit device transmits a timing signal to the second integrated circuit device, wherein the timing signal includes a first transition and a second transition. The first integrated circuit device then delays the data, so that the data is delayed relative to the timing signal by a first predetermined delay time. Next, the first integrated circuit device transmits the delayed data to the second integrated circuit device. The second integrated circuit device then receives the timing signal and the delayed data. Next, the second integrated circuit device delays the first transition of the timing signal by a second predetermined delay time to generate a delayed version of the first transition. The second integrated circuit device then senses the data during a time interval between the delayed version of the first transition and the second transition.

31 Claims, 8 Drawing Sheets

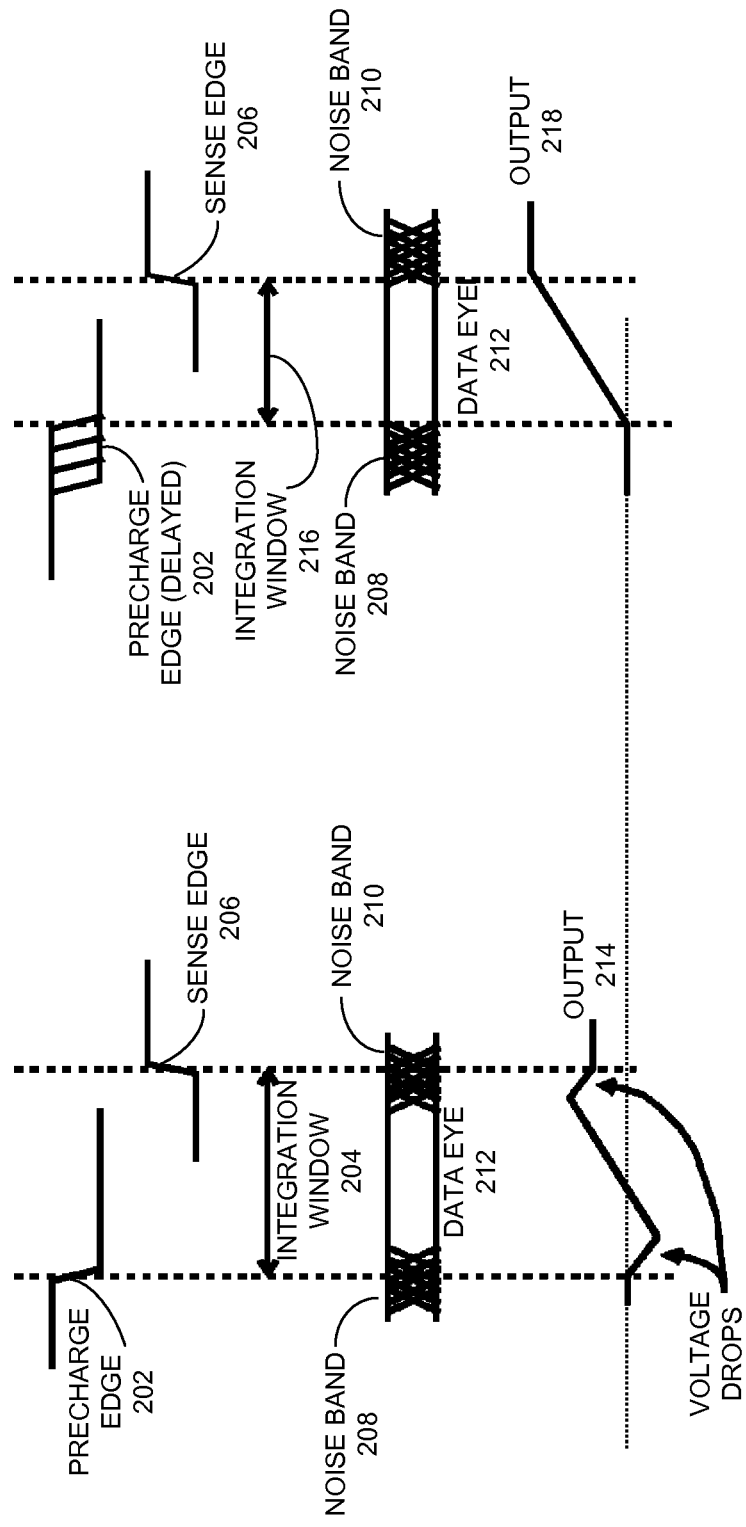

HIGH-SPEED SOURCE-SYNCHRONOUS SIGNALING

RELATED APPLICATION

The present patent is a continuation of, and hereby claims priority under 35 U.S.C §120 to PCT application No. PCT/US/2009/042044, entitled "High-Speed Source-Synchronous Signaling," by inventors Jared Zerbe, filed on 29 Apr. 2009, which claims priority under 35 U.S.C. §119 to U.S. Provisional Application No. 61/049,851, entitled "High-Speed Source-Synchronous Signaling," by inventor Jared Zerbe, filed on 2 May 2008.

TECHNICAL FIELD

The present embodiments generally relate to techniques for communicating between a transmitter and a receiver, for example, disposed on separate integrated circuit devices. More specifically, the present embodiments relate to a method and system for source-synchronous signaling across a communication channel.

BRIEF DESCRIPTION OF THE FIGURES

FIG. 2A illustrates the phase relationships between the received clock edges and the received data transitions at an integrating receiver.

FIG. 2B illustrates a technique for increasing the integration output during the data sampling process by using windowing-based integration.

DETAILED DESCRIPTION

The following description is presented to enable any person skilled in the art to make and use the invention, and is provided in the context of a particular example application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The following description presents various example methods and apparatus for communication between a transmitter and a receiver. Source synchronous signaling involves transmitting a timing reference, in the form of a strobe signal or clock signal, along with data such that the timing reference can then be used at the receiver for capturing the data. In particular embodiments, clock edge transitions used to generate the beginning and ending of a particular unit bit time at the transmitter are then used to recover the same bit at the receiver. In some embodiments, this is achieved by using two delay elements, with one placed on the transmitter-side and the other on the receiver-side.

Figure 1:
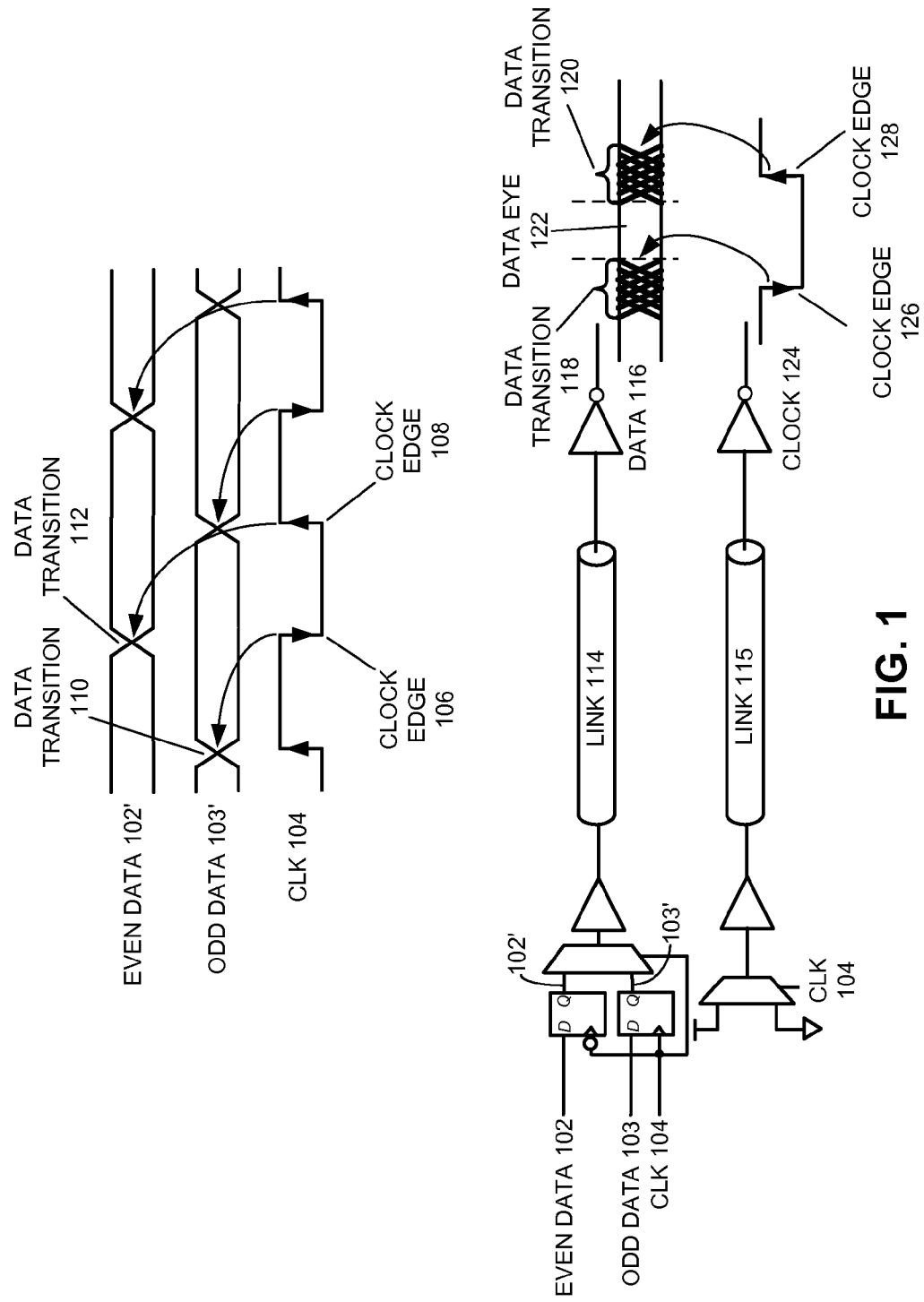
FIG. 1 presents a block diagram illustrating a system which transmits data and an associated clock signal over a communication channel.

FIG. 1 presents a block diagram illustrating a system which transmits data 102/103 and an associated clock 104 over a communication channel. In particular, data 102/103 and clock 104 are source-synchronized at the same device to reduce timing skews between the two signals. More specifically, clock 104 includes a pair of consecutive clock edges: a falling edge 106 followed by a rising edge 108, which are used to sample a corresponding pair of data transitions 110 and 112 using a pair of falling and rising-edge triggered flip-flops and interleaving even and odd data streams 102' and 103' by means of an output multiplexer into a single data stream which feeds into link 114. During this process, data values resulting from data transitions 110 and 112 are output-timed via the output mux select input and clock edges 106 and 108 and then transmitted over a link 114. The data is then received at the receiver to form received data 116, which includes data transitions 118 and 120 corresponding to the data resulting from transitions 110 and 112 but whose timing was set by the output mux and clock edges 106 and 108. Further data transitions and clock edges can be extrapolated beyond the simple pair shown. Note also that the received data transitions become "noisy" due to inter-symbol-interference (ISI), jitter, and other sources of noise in the transmission system. The noisy data transitions 118 and 120 are characterized by a noise band which is significantly broader than the original clock edges 106 and 108. Note that this noise band is comprised of invalid data which does not provide the correct data value at a given sampling phase. As a result, the data eye 122 between the two noise bands, which defines a consistently valid data region for sampling, becomes narrower.

Separately, clock 104 is transmitted over a link 115 and is received at the receiver to form a received clock 124, which includes clock edges 126 and 128 corresponding to clock edges 106 and 108, respectively. In some embodiments, the same clock edge which generates the data transition on the transmitter is also used to recover the data associated with the data transition at the receiver. For example, clock edges 126 and 128 are used to recover the data in data eye 122 in FIG. 1. In some embodiments, recovering data at the receiver involves using a precharge-sense technique based on a pair of consecutive clock edges. For example, first clock edge 126 can be used as a precharge edge for starting an integration operation on the received data 116 while the second clock edge 128 can be used as a sense edge to trigger a sampling operation. Hence, the time interval between the precharge edge and the sense edge defines a sampling window.

FIG. 2A illustrates phase relationships between the received clock edges and the received data transitions at the receiver. As illustrated in FIG. 2A, in some embodiments the release of the precharge edge 202 controls the beginning of an integration window 204, while the sense edge 206 activates a sense operation which samples data values from the integration output and thereby controls the end of integration window 204. In some embodiments, sense edge 206 releases a sense amplifier without stopping the integration. Hence, the duration of integration time before sampling is set by integration window 204. Furthermore, because the clock edges are substantially aligned with the original data transitions in the transmitter (as shown in FIG. 1), the precharge edge 202 and sense edge 206 fall in the middle of the noise bands 208 and 210 associated with the data transitions at the receiver. Consequently, integration window 204 is wider than the valid data eye 212 defined by the inner edges of the noise bands 208 and 210. As a result, portions of the noise bands are integrated at both ends of the integration window 204, which can give rise to a significant drop in the integration output 214. As illustrated in FIG. 2A, this drop can affect the sense value at sense edge 206. Hence, it is desirable to adjust integration window 204 in accordance with the actual open width of data eye 212, which becomes narrower than a full clock phase due to various non-idealities of the transmission system.

FIG. 2B illustrates a technique for increasing the integration output during the data sampling process by using windowing-based integration. Note that by delaying precharge edge 202 relative to the first noise band 208 and, while adjusting sense edge 206 to occur before the second noise band 210, the new integration window 216 avoids integration within the noise bands. Because the integration is performed only on the valid data within data eye 212, the integration output and thus the sampled voltage 218 can be significantly increased, and in fact maximized to the extent possible by the width of the valid data eye 212. Embodiments relating to windowing-based integration are described in more detail below.

In some embodiments, the transmitter-side clock edges and the corresponding receiver-side clock edges are "colored." In other words, the individual clock edges which generate the beginning and ending of a particular bit cell at the transmitter are transmitted in a source-synchronous fashion to the receiver and then the same two edges are used to recover the same bit cell at the receiver. In some embodiments, this clock-edge "coloring" is achieved by using two delay elements, with one placed on the transmitter-side and the other on the receiver-side. As will be shown in more detail below, using these two delay elements facilitates performing arbitrary phase alignment between the clock and the corresponding data at the receiver. Consequently, if a sampled receiver is used, the edge used to sample the center of the data eye at the receiver may correspond to the edge which started the data transition at the beginning of the data eye or the edge that created the edge transition at the end of the data eye.

Figure 3A:
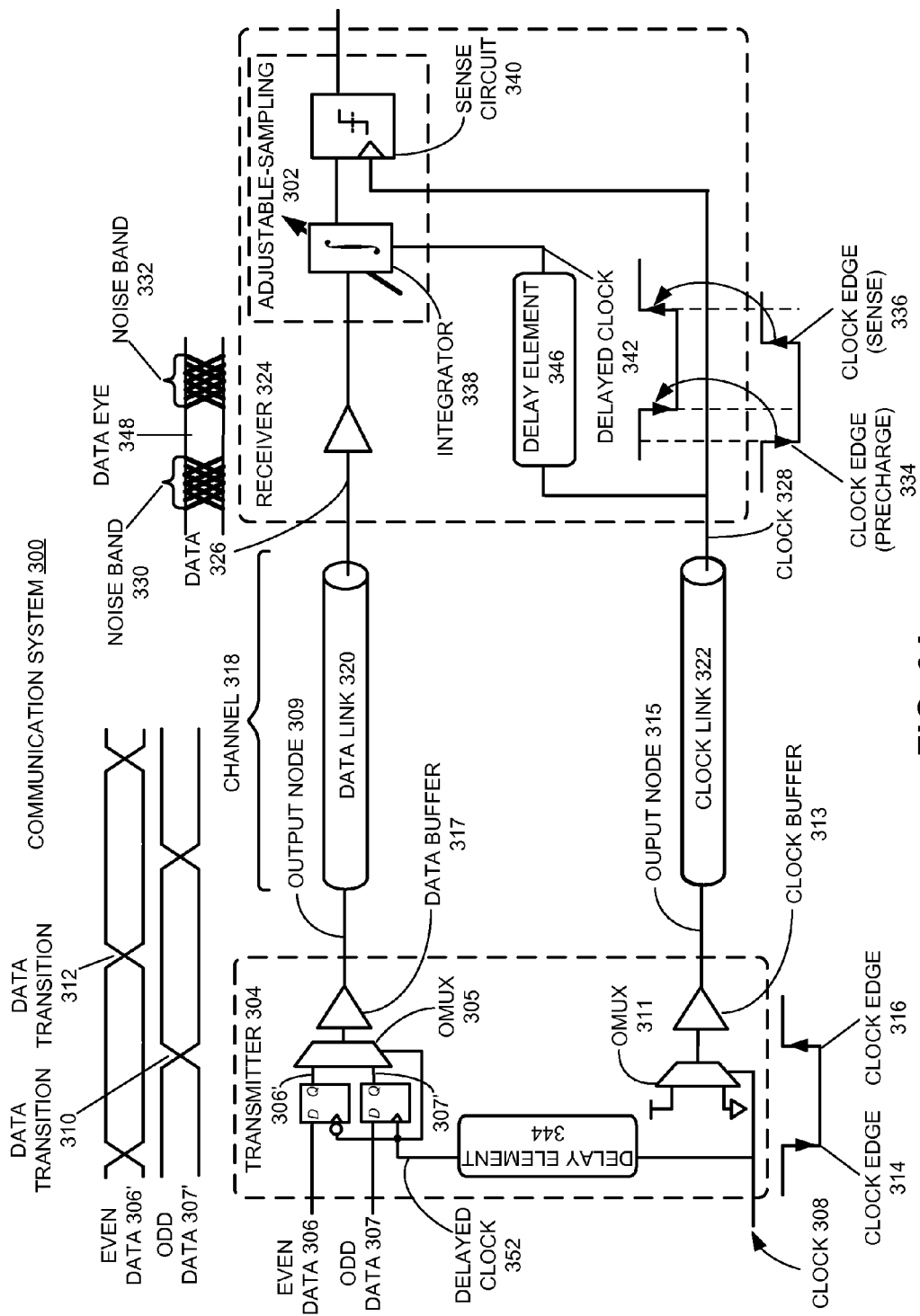
FIG. 3A presents a block diagram illustrating a communication system using both transmitter-side and receiver-side delay elements.

FIG. 3A presents a block diagram illustrating a communication system 300 using both transmitter-side and receiver-side delay elements. Note that system 300 includes a transmitter 304 that receives even data stream 306, odd data stream 307 and clock 308. In this embodiment, a first data transition 310 in odd data stream 307' is followed by a second data transition 312 in even data stream 306', while clock 308 includes a clock window formed by a falling clock edge 314 followed by a rising clock edge 316. Note that although we describe the operation below in terms of a falling-edge-to-rising-edge clock window, the same description is equally applicable to the rising-edge-to-falling-edge clock window. In fact, while an interleaved double-data-rate ("DDR") system is shown, system 300 can include a single-data-rate ("SDR")-base system, a quad-data-rate ("QDR")-based system, an octal data rate ("ODR"), or systems based on other types of clocking modes.

Note that falling edge 314 and rising edge 316 are aligned to transition in approximately the center of odd and even data 306' and 307' after data transitions 310 and 312, respectively. In some embodiments, system 300 is a source-synchronous signaling system wherein data 309 and clock 315 are source-synchronized signals. In these embodiments, clock edges 314 and 316 are used to time the transmission of data resulting from transitions 310 and 312, respectively.

Transmitter 304 transmits even data stream 306 and odd data stream 307, which are interleaved together, as well as clock 308 over channel 318 through a data link 320 and a clock link 322, respectively. More specifically, even data stream 306 and odd data stream 307 pass through a pair of odd/even flip-flops and then through an output multiplexer (omux) 305, which combines the two data streams, before passing through a data buffer 317 to reach a first output node 309, where the combined data is transmitted onto data link 320. Separately, clock 308 passes through a 0/1-tied output multiplexer (omux) 311 and a clock buffer 313 to reach a second output node 315, where clock 308 is transmitted onto clock link 322. The combined data 306/307 and clock 308 are received at a receiver 324 as received data 326 and received clock 328, respectively. In some embodiments, however, the combined data 306/307 and clock 308 are transmitted over the same link between transmitter 304 and receiver 324. This can be accomplished by transmitting the data and clock signals over the same link in different modes. Note that the received data 326 includes a first noise band 330 corresponding to data resulting from transition 310 with timing from clock edge 314 which is followed by a second noise band 332 corresponding to data resulting from transition 312 with timing from clock edge 316. Moreover, received clock 328 includes a clock edge 334 associated with first noise band 330, followed by a clock edge 336 associated with second noise band 332.

Receiver 324 also includes the adjustable-sampling circuit 302, which comprises an integrator 338 coupled to a sense circuit 340. Integrator 338 receives data 326 as data input and a clock 342 that controls the start of the integration operation. The output of integrator 338 is coupled to the data input of sense circuit 340, which directly receives clock 328 to control the sense operation which effectively ends the integration operation. In some embodiments, sense circuit 340 is an edge-triggered sense circuit.

Note that system 300 also includes a transmitter-side delay element 344 and a receiver-side delay element 346. Each of these delay elements can be implemented using a vernier delay element, a delay-line, a PLL, or other delay means. In some embodiments the two different delay elements can use elements in-common, and in some cases, share some or all calibration codes in common. The two delay elements generate two relative timing delays which can be used to adjust the phase relationships between received data 326 and received clock 328, so that adjustable-sampling circuit 302 operates with a window within the data eye 348 between noise bands 330 and 332. It should be noted that there are multiple ways of creating the delays needed on either the transmitter or the receiver side, and the techniques used need not be identical on both sides. In particular, in one embodiment the transmitter (such as transmitter 304) can use a phase mixer extracting arbitrary phase angles from a transmitter-side PLL in order to have low jitter clocks with arbitrary phase position. In addition, some embodiments may use one or the other of delay elements 344 and 346 and not both and thereby experience some but not all of the benefits of a window tuned to eliminate both noise bands.

More specifically, transmitter-side delay element 344 delays the original clock 308 by a first predetermined delay time to generate a delayed clock 352. Delayed clock 352 is then used to clock even data stream 306 and odd data stream 307 through a pair of flip-flops, which delays the combined output data relative to the original transmitter clock 308 by the same predetermined delay time. Consequently, received clock 328 thus leads the received data 326 by the same amount because of delay element 344. In particular, the second clock edge 336 of the transmitted clock 328 is a sense edge which is coupled to the clock of sense circuit 340. Because of the first predetermined delay time, the second clock edge 336 triggers sensing of the received data 326 earlier than it would in a traditional source-synchronous system, thus facilitating the movement of it 'inside' the noise band 332.

Figure 3B:
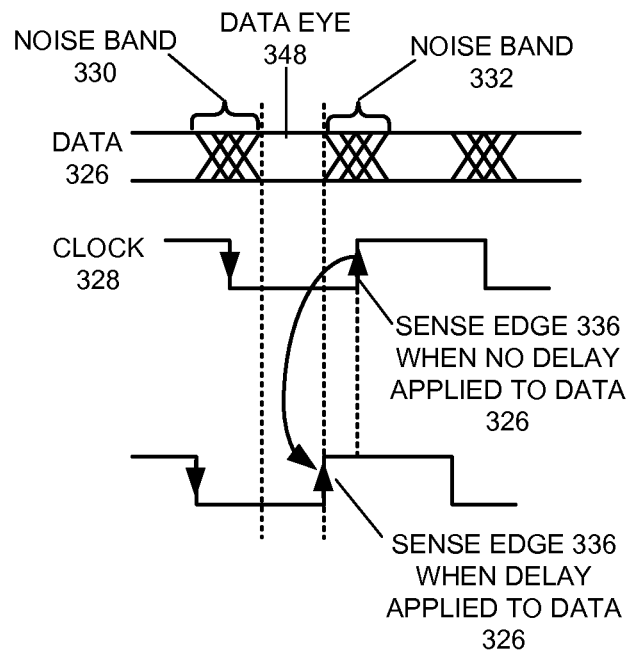
FIG. 3B illustrates how a noise band in the delayed data is adjusted relative to the sense edge.

FIG. 3B illustrates how noise band 332 in the delayed data 326 is adjusted relative to sense edge 336. Note that without applying the delay to clock 308, sense edge 336 triggers the sense operation within the noise band 332. In the embodiment illustrated in FIG. 3A, a second noise band 332 associated with data transition 312 is delayed relative to sense edge 336, which causes sense edge 336 to shift relative to the data earlier toward the center of the data eye 348 defined by the inner edges of the noise bands 330 and 332. The amount of delay is calibrated at the first delay element 344 so that sense edge 336 substantially aligns with the beginning (edge) of the second noise band 332 as shown in FIG. 3B. In some embodiments, the edge of noise band 332 can be defined based on where an acceptable bit-error-rate is achieved. In some embodiments, other techniques are used to define the edge of noise band 332. Consequently, the exactly location of the edge of noise band 332 may vary depending on the particular technique that is used.

Referring back to FIG. 3A, note that the receiver-side delay element 346 delays clock 328 by a second predetermined delay time to produce the delayed clock 342, which thus contains within it a delayed version of clock edge 334. In particular, the delayed version of clock edge 334 provides a precharge edge which determines the start of the integration operation on integrator 338.

Figure 3C:
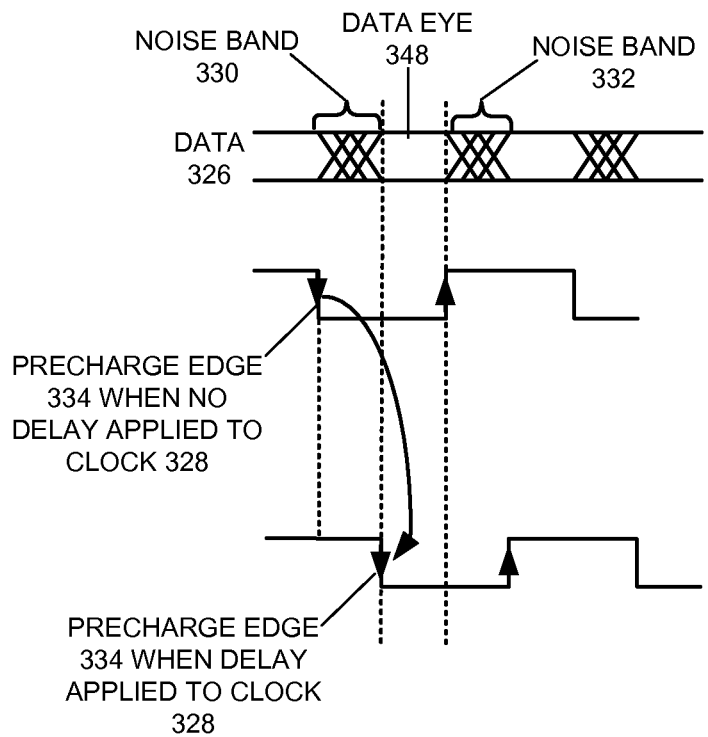
FIG. 3C illustrates how the precharge edge is adjusted relative to a noise band in the delayed data.

FIG. 3C illustrates how the precharge edge (provided by the delayed version of clock edge 334) is adjusted relative to noise band 330 in delayed data 326. Note that without applying the delays to both clock 328 and data 326, the precharge edge is positioned relative to noise band 330 as shown in FIG. 3B. If a delay is applied to data 326 but no delay is applied to clock 328, in some embodiments the precharge edge is positioned relative to noise band 330 as shown in FIG. 3C which is to the left of noise band 330. Alternately with no delay applied to data 326 the precharge edge can be positioned in the center of noise band 330 similar to the sense case. In the embodiment illustrated in FIG. 3A, the precharge edge is delayed by delay element 346 so that it moves toward data eye 348, which is defined by the inner edges of the noise bands. The amount of delay is calibrated at second delay element 346 so that the precharge edge substantially aligns with the end of the first noise band 330 as shown in FIG. 3C. In some embodiments, the edge of noise band 330 can be defined based on where an acceptable bit-error-rate is achieved. In some embodiments, other techniques are used to define the edge of noise band 330. Consequently, the exactly location of the edge of noise band 330 may vary depending on the particular technique that is used.

Note that the two delays are introduced on integrated circuit devices positions at different sides of channel 318. More specifically, a sense-edge delay at receiver 324 is achieved by delaying the input data from the transmitter side, while the precharge-edge delay is achieved by delaying the received clock 328 at the receiver side. This facilitates maintaining the association between clock edges 314 and 316 and data transitions 310 and 312, thereby facilitating alignment of the precharge edge and sense edge with data eye 348. Further precision in the placement of the edges is allowed by use of two separate signals of the same (DDR) clock rate at the receiver. Note, in this example, that this delay and alignment technique does not require adding substantial delay to the clock as a method of deskewing clock and data by creating a skew whose phase would appear to be zero but is in fact 'rounded up' to become substantially an integer multiple of 1-unit-interval ("UI") as is commonly done. Maintaining matching (or 'coloring') between clock and data edges, in this example, better facilitates high-speed operation by facilitating keeping sources of jitter and distortion in-common between individual edges of clock and data.

In one embodiment, adjustable-sampling circuit 302 can include a control mechanism configured to disable/bypass the integrator 338 so that data 326 passes through integrator 338 to the sense circuit 340 without a substantial integration. This configuration is useful during the process of calibrating the delay on delay element 344 for aligning the sense edge with the data eye. Adjustable-sampling circuit 302 is switched back to the regular integrating-sampling mode when this calibration is complete. Alternately the sense circuit may be use to directly sample data with the integrator bypassed if higher performance is achieved this way.

Figure 3D:
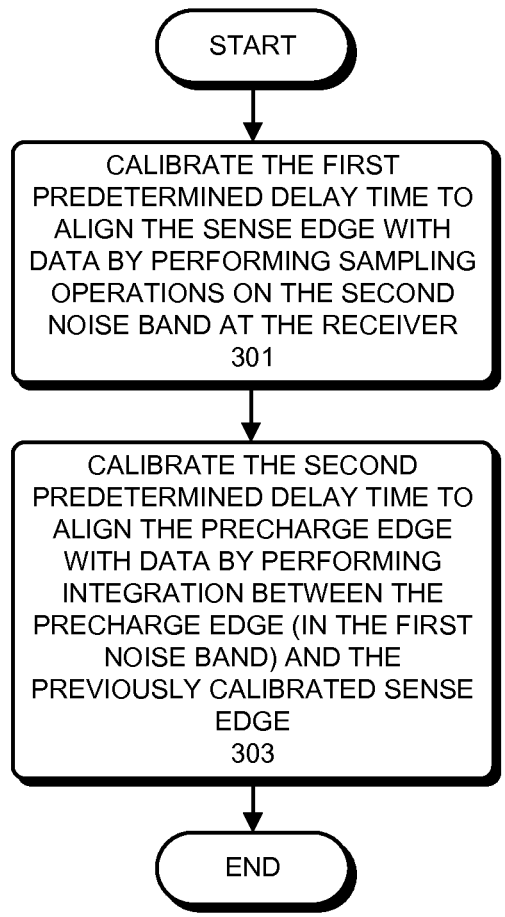
FIG. 3D presents a flowchart illustrating the process of calibrating the two predetermined delay times in the communication system.

FIG. 3D presents a flowchart illustrating the process of calibrating the two predetermined delay times in communication system 300. During operation, the system first calibrates the first predetermined delay time to align the sense edge with data by performing sampling operations on the second noise band 332 at receiver 324 (step 301). More specifically, integrator 338 is disabled/bypassed or its integration window substantially reduced so that delayed data 326 passes through the integrator circuit to the sense circuit 340 without a substantial integration. In some embodiments, sense circuit 340 includes a sense amplifier. Sense circuit 340 samples second noise band 332 while moving sense edge 336 toward the beginning of noise band 332 by adding additional delay at delay element 344. The calibration is complete when the sense output voltage is maximized, or alternately when the bit-error-rate is reduced to an acceptable level, which is defined by the number of errors received at adjusted phase position relative to the errors received if the sampler is positioned at the center of the valid data eye.

Next, the system calibrates the second predetermined delay time to align the precharge edge with the data by performing an integration operation between the precharge edge (in the first noise band 330) and the previously calibrated sense edge (step 303). More specifically, integrator 338 is enabled so that adjustable-sampling circuit 302 is in a full-integration mode. Integrator 338 then starts to integrate from the precharge edge until the sense edge is reached. By adding more delay at delay element 346, precharge edge 334 is moved toward the end of noise band 330 and the integration voltage at the sense edge is increased. The calibration is completed when the integrator output voltage is maximized, or alternately when the bit-error-rate is reduced to an acceptable level, which is defined by the number of errors received at adjusted phase position relative to the errors received if the sampler is positioned at the center of the data eye. In an alternate embodiment, the delay used for precharge calibration can be a direct copy of the sense calibration or twice that of the value of the sense calibration. This method has the advantage of being simpler to implement and can be very effective for systems which have noise bands which are substantially equal.

It should be noted that both calibration sequences can be completed with arbitrary or predetermined data patterns, with the desire to be to have data patterns with frequency content representative of the data that is to be transmitted during normal operation, and thus generating noise bands representative of normal operation. Additional margin may be employed by the addition of some incremental delay to elements 344 or 346 beyond the calibrated value to accommodate the potential of jitter or increased noise bands during normal operation that were not represented during calibration.

Figure 3E:
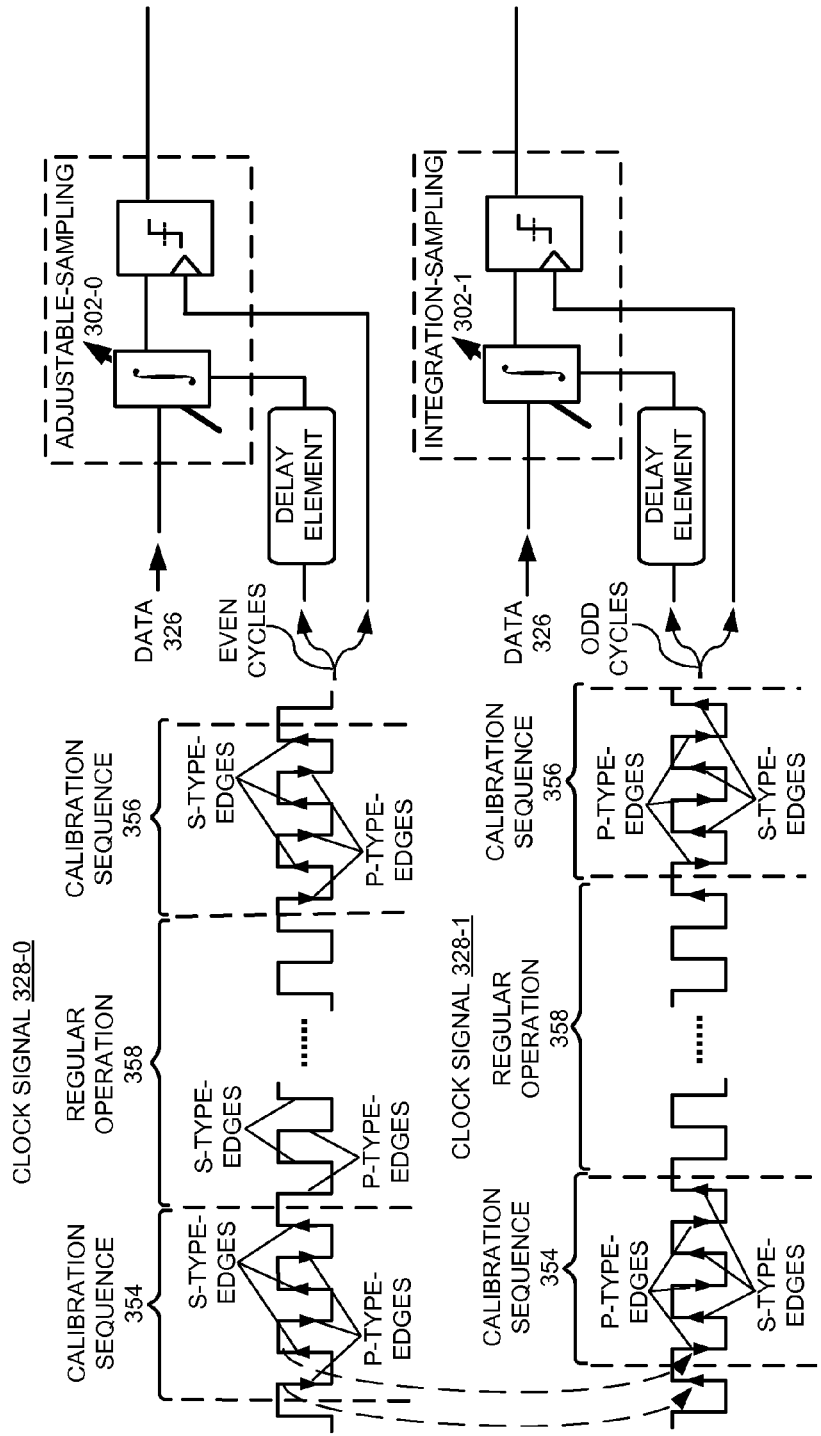
FIG. 3E illustrates an embodiment of communication system 300 in order to accommodate double data rate (DDR) operation.

FIG. 3E illustrates further detail to the aspects of communication system 300 required in order to accommodate a double data rate ("DDR") operation. Note that to achieve the DDR operation in system 300, two substantially identical adjustable-sampling circuits 302-0 and 302-1 are concurrently used as two parallel sampling streams. Note that both adjustable-sampling circuits receive the same input data 326. However, the two adjustable-sampling circuits receive complimentary clock signals 328-0 and 328-1, respectively, wherein clock signals 328-0 and 328-1 are inverted versions of each other from the same clock source 328. Note that in this integration-sampling configuration, each clock cycle is divided into two precharge-sense cycles, which are interleaved and separated into on the two sampled streams. We refer to the precharge-sense cycles implemented on the two data channels as "even" cycles and "odd" cycles, respectively. In some embodiments, each of the clock signals has a 50/50 duty cycle.

More specifically, clock signal 328-0 illustrated in FIG. 3E comprises two calibration sequences 354 and 356, wherein each of the calibration sequences is comprised of multiple DDR clock cycles. Each DDR clock cycle further comprises a first edge which correlates to the release of precharge (referred to as a "p-type-edge") followed by a second edge which correlates to the release of sense (referred to as an "s-type-edge"). Hence, each DDR clock cycle (a pair of p-type-edge and s-type-edge shown in FIG. 3E) defines a precharge-sense cycle. In some embodiments, each calibration sequence is used to calibrate at least one of the clock edges (i.e., the precharge edge and the sense edge). For example, in one embodiment, each of the calibration sequences 354 and 356 is used to calibrate both the precharge edge and the sense edge for alignment with the data eye. In another embodiment, calibration sequence 354 is used to calibrate the sense edge while calibration sequence 356 is used to calibrate the precharge edge, respectively. Note that calibration sequences 354 and 356 are separated by a period of regular operation 358, which is also comprised of precharge-sense cycles. The length of regular operation 358 may be predetermined or dynamically determined during system operation. Note that although six (three even and three odd) precharge-sense cycles are shown for each calibration sequence, fewer or more precharge-sense cycles may be used. Furthermore, although two calibration sequences are shown, more calibration sequences may be used during system operation.

It should be further noted that the precharge edges for odd and even samplers 302-0 and 302-1 can be independently created by different delay elements as shown in FIG. 3E, or in an alternate embodiment could be created by use of a single delay element and complementary outputs feeding even and odd samplers.

Figure 3F:
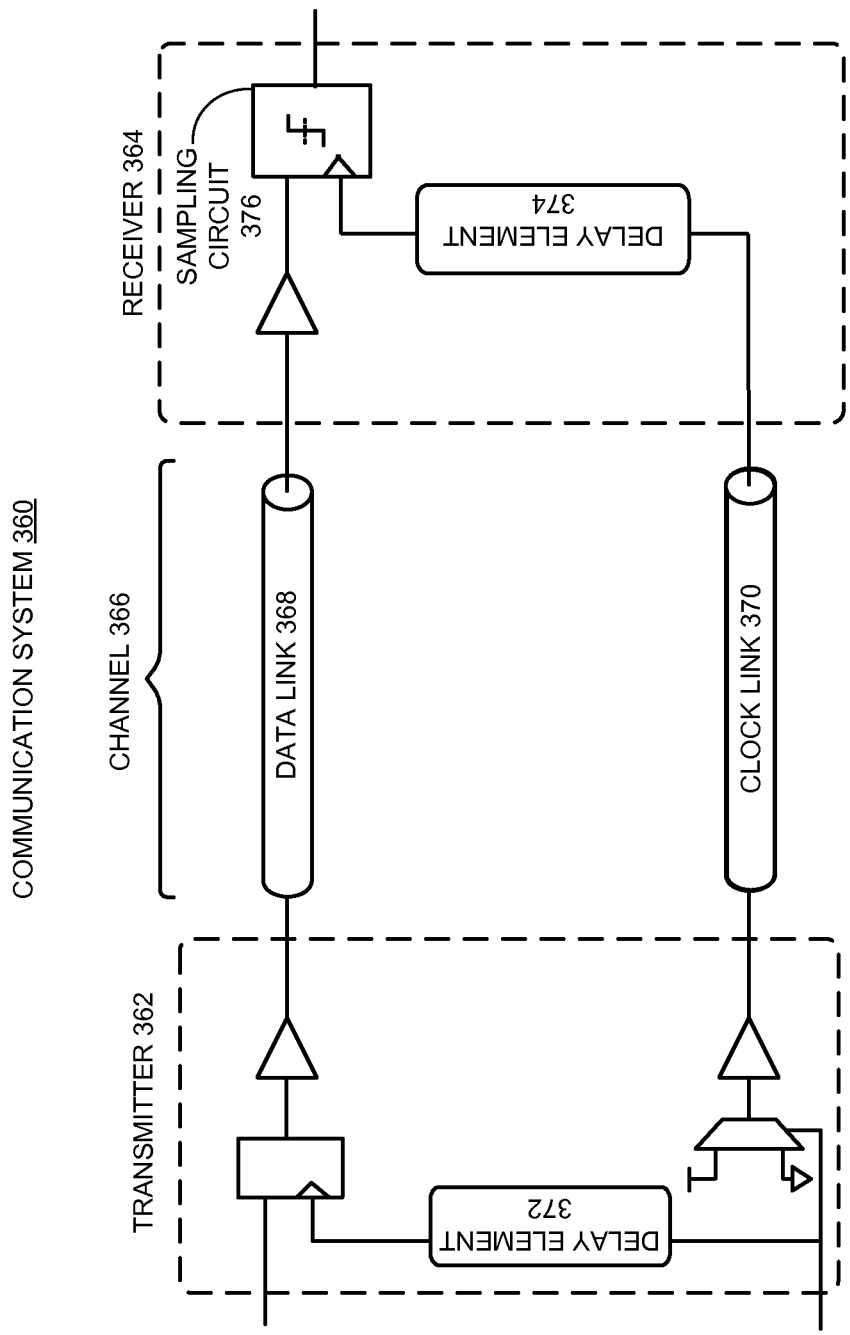
FIG. 3F presents a block diagram illustrating a communication system which is a simplified version of communication system 300.

FIG. 3F presents a block diagram illustrating a communication system 360 which is a simplified version of system 300. Note that system 360 includes substantially the same components as system 300, such a transmitter 362, a receiver 364, a channel 366 which further includes a data link 368 and a clock link 370. System 360 also includes both a transmitter-side delay element 372 and a receiver-side delay element 374. However, at receiver 364, system 360 uses simply a sampling circuit 376 that includes a sensing circuit but without an integrator as in system 300. In this embodiment, the received data at receiver 364 is directly sampled without integration, and a delayed clock from delay element 374 is used to directly control the timing of sampling circuit 376 instead of controlling the start of integration operation on the received data. Note that without performing the integration on the received data, the data-clock alignment may not achieve the same precision as in system 300. However, in some applications, this simplified receiver 364 may achieve sufficient data-clock alignment by using the two delay elements. In this embodiment an alternate calibration technique can be used to adjust the delay elements 372 and 374 to find the extents of the data eye and center the sampling point of sampling circuit 376 for the largest timing margin.

Note that because the above-described data-clock-synchronization technique is applicable to source-synchronous communication between two integrated circuit devices, this technique can be used in any system that includes a source-synchronous dynamic random access memory device ("DRAM"). Such system can be, but is not limited to, a mobile system, desktop computer, server, and/or a graphics application. Moreover, the DRAM may be, e.g., graphics double data rate (GDDR, GDDR2, GDDR3, GDDR4, GDDR5, and future generations, and double data rate DDR2, DDR3 and future memory types. The source synchronous techniques described may be applicable to other types of memory, for example, Flash and other types of non volatile memory and static random access memory (SRAM). One or more of the techniques or apparatus described herein are applicable to front side bus, (i.e., processor to bridge chip, processor to processor, and/or other types of chip-to-chip interfaces). Note that the two communicating integrated circuit IC chips (i.e., the transmitter and receiver) can also be housed in the same package, e.g., in a stacked die approach. Furthermore, the transmitter, receiver and the channel can all be built on-die in a system-on-a-chip (SOC) configuration. Moreover, throughout this description, a clock signal is described and it should be understood that a clock signal in the context of the instant description may be embodied as a strobe signal or other signal that conveys a timing reference and is not limited to a signal that is strictly periodic. For example, the clock signal may be a strobe signal that is aperiodic in the sense that transitions only occur when data is being transmitted. In the general context, the clock signal may be any type of signal that conveys timing information (e.g., temporal information that indicates that data is valid).

Figure 4:
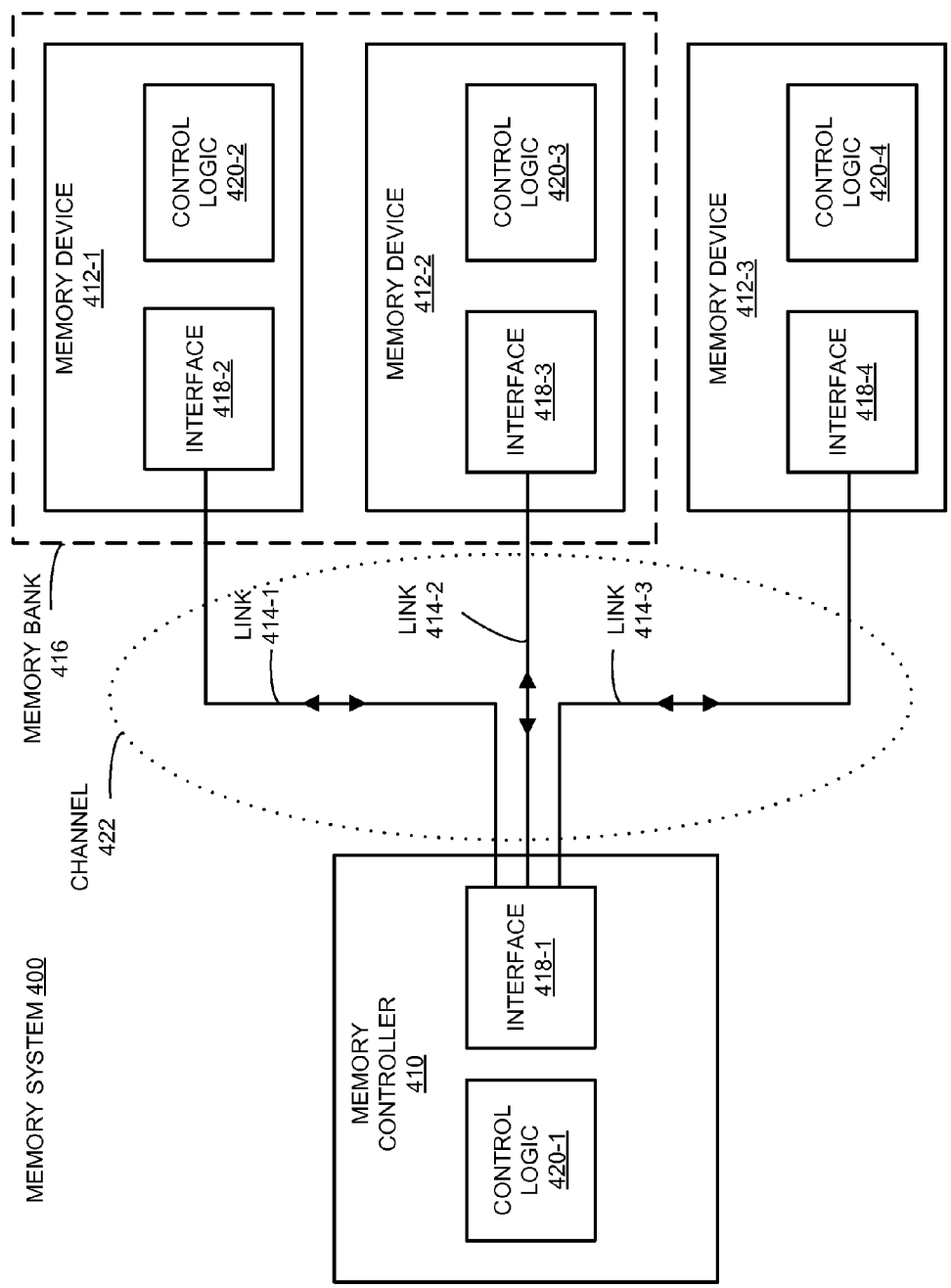
FIG. 4 presents a block diagram illustrating an embodiment of a memory system, which includes at least one memory controller and one or more memory devices.

Additional embodiments of systems, such as memory systems, that may use one or more of the above-described clock-data synchronization techniques are described below. FIG. 4 presents a block diagram illustrating an embodiment of a memory system 400, which includes at least one memory controller 410 and one or more memory devices 412. While FIG. 4 illustrates memory system 400 with one memory controller 410 and three memory devices 412, other embodiments may have additional memory controllers and fewer or more memory devices 412. Moreover, while memory system 400 illustrates memory controller 410 coupled to multiple memory devices 412, in other embodiments two or more memory controllers may be coupled to one another. Note that memory controller 410 and one or more of the memory devices 412 may be implemented on the same or different integrated circuits, and that the one or more integrated circuits may be included in a chip-package.

In some embodiments, the memory controller 410 is a local memory controller (such as a DRAM memory controller) and/or is a system memory controller (which may be implemented in a microprocessor).

Memory controller 410 may include an I/O interface 418-1 and control logic 420-1. As discussed in FIGS. 3A-3D, control logic 420-1 may be used to calibrate the first and second predetermined delay times for delay elements 344 and 346.

In some embodiments, one or more of memory devices 412 include control logic 420 and at least one of interfaces 418. However, in some embodiments some of the memory devices 412 may not have control logic 420.

Moreover, memory controller 410 and/or one or more of memory devices 412 may include more than one of the interfaces 418, and these interfaces may share one or more control logic 420 circuits. Note that in some embodiments two or more of the memory devices 412, such as memory devices 412-1 and 412-2, may be configured as a memory bank 416.

Memory controller 410 and memory devices 412 are coupled by one or more links 414, such as multiple wires, in a channel 422. While memory system 400 is illustrated as having three links 414, other embodiments may have fewer or more links 414. Moreover, these links may provide: wired, wireless and/or optical communication. Furthermore, links 414 may be used for bi-directional and/or uni-directional communication between the memory controller 410 and one or more of the memory devices 412. For example, bi-directional communication between the memory controller 410 and a given memory device may be simultaneous (full-duplex communication). Alternatively, the memory controller 410 may transmit information (such as a data packet which includes a command) to the given memory device, and the given memory device may subsequently provide requested data to the memory controller 410, e.g., a communication direction on one or more of the links 414 may alternate (half-duplex communication). Note that one or more of the links 414 and corresponding transmit circuits and/or receive circuits may be dynamically configured, for example, by one of the control logic 420 circuits, for bi-directional and/or unidirectional communication.

Signals corresponding to data and/or commands (such as request-for-data commands) may be communicated on one or more of the links 414 using either or both edges in one or more timing signals. These timing signals may be generated based on one or more clock signals, which may be generated on-chip (for example, using a phase-locked loop and one or more reference signals provided by a frequency reference) and/or off-chip. In some embodiments, operations involved in transmitting and receiving these signals may be synchronous and/or asynchronous.

Note that modulation coding may include bit-to-symbol coding in which one or more data bits are mapped together to a data symbol, and symbol-to-bit coding in which one or more symbols are mapped to data bits. For example, a group of two data bits can be mapped to one of four different amplitudes of an encoded data signal. In general, the encoding can include pulse amplitude modulation (PAM). For example, the modulation coding may include: two-level pulse amplitude modulation (2-PAM), three-level pulse amplitude modulation (3-PAM), and/or four-level pulse amplitude modulation (4-PAM).

Additionally, note that the modulation coding may be dynamically adjusted, for example, based on a performance metric associated with communication on one or more of the links 414. This performance metric may include: a signal strength (such as a signal amplitude or a signal intensity), a mean square error (MSE) relative to a target (such as a detection threshold, a point in a constellation diagram, and/or a sequence of points in a constellation diagram), a signal-to-noise ratio (SNR), a bit-error rate (BER), a timing margin, and/or a voltage margin.

In some embodiments, commands are communicated from the memory controller 410 to one or more of the memory devices 412 using a separate command link, i.e., using a subset of the links 414 which communicate commands. This separate command link may be wireless, optical and/or wired. However, in some embodiments commands are communicated using the same portion of the channel 422 (i.e., the same links 414) as data. Moreover, communication of commands: may have a lower data rate than the data rates associated with communication of data between the memory controller 410 and one or more of the memory devices 412; may use different carrier frequencies than are used to communicate data; and/or may use a different modulation technique than is used to communicate data.

Note that in some embodiments the memory controller 410 and/or one or more of the memory devices 412 may use additional techniques to recover or prevent the loss of data communicated between components in the memory system 400 and/or the loss of stored data. For example, at least a portion of the data communicated between the components and/or the stored data may include error-detection-code (EDC) information and/or error-correction-code (ECC) information. This EDC and/or ECC information may be pre-existing or may be dynamically generated (e.g., in real time).

In some embodiments, the ECC information includes a Bose-Chaudhuri-Hocquenghem (BCH) code. Note that BCH codes are a sub-class of cyclic codes. In exemplary embodiments, the ECC information includes: a cyclic redundancy code (CRC), a parity code, a Hamming code, a Reed-Solomon code, and/or another error checking and correction code.

Consequently, in some embodiments receive circuits implement error detection and/or correction. For example, errors associated with communication may be detected by performing a multi-bit XOR operation in conjunction with one or more parity bits in the signals.

Devices and circuits described herein may be implemented using computer-aided design tools available in the art, and embodied by computer-readable files containing software descriptions of such circuits. These software descriptions may be: behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

In summary, this disclosure has described example techniques for communicating data from a first integrated circuit device to a second integrated circuit device. During operation, the first integrated circuit device transmits a timing signal to the second integrated circuit device, wherein the timing signal includes a first transition and a second transition. The first integrated circuit device then delays the data, so that the data is delayed relative to the timing signal by a first predetermined delay time. Next, the first integrated circuit device transmits the delayed data to the second integrated circuit device. The second integrated circuit device then receives the timing signal and the delayed data. Next, the second integrated circuit device delays the first transition of the timing signal by a second predetermined delay time to generate a delayed version of the first transition. The second integrated circuit device then senses the data during a time interval between the delayed version of the first transition and the second transition.

In some embodiments, the first transition is a rising edge transition and the second transition is a falling edge transition; or the first transition is a falling edge transition and the second transition is a rising edge transition.

In some embodiments, the first and second data are consecutive data.

In some embodiments, the first integrated circuit device delays the data by delaying the timing signal, thereby generating a delayed timing signal and then using the delayed timing signal to delay the data.

In some embodiments, the first integrated circuit device delays the timing signal by using a first delay element on the first integrated circuit device to delay the timing signal.

In some embodiments, the second integrated circuit device delays the first transition of the timing signal by using a second delay element on the second integrated circuit device to delay the timing signal.

In some embodiments, the first integrated circuit device transmits the timing signal by transmitting the timing signal via a first communication channel coupled between the first integrated circuit device and the second integrated circuit device. Additionally, the first integrated circuit device transmits the delayed data by transmitting the delayed data via a second communication channel coupled between the first integrated circuit device and the second integrated circuit device.

In some embodiments, the first integrated circuit device comprises at least one transmitter and the second integrated circuit device comprises at least one receiver.

In some embodiments, the second integrated circuit device senses the data during the time interval between the delayed version of the first transition and the second transition by first using the delayed version of the first transition to start integration of the data, and then using the second transition as a sense edge to trigger sensing of the data.

In some embodiments, the delayed data at the second integrated circuit device includes the delayed first and second data, which are associated with a first noise band and a second noise band, respectively. Moreover, a window between the end of the first noise band and the beginning of the second noise band defines a time interval for sensing the data.

In some embodiments, the first integrated circuit device delays the data by calibrating the first predetermined delay time so that the second transition substantially aligns with the beginning of the second noise band at the second integrated circuit device.

In some embodiments, the first integrated circuit device calibrates the first predetermined delay time by causing the second integrated circuit device to perform sampling operations on the second noise band while moving the second transition toward the beginning of the second noise band.

In some embodiments, the second integrated circuit device delays the first transition by calibrating the second predetermined delay time so that the delayed version of the first transition substantially aligns with the end of the first noise band at the second integrated circuit device.

In some embodiments, the second integrated circuit device calibrates the second predetermined delay time by integrating the delayed data to maximize the integrated voltage while moving the first transition toward the end of the first noise band.

In some embodiments, the first integrated circuit device delays the data prior to the second integrated circuit device delaying the first transition of the timing signal.

In some embodiments, the second integrated circuit device directly uses the delayed version of the first transition as a sense edge to trigger sensing of the data.

This disclosure has described a system that communicates data between a first integrated circuit device and a second integrated circuit device. The first integrated circuit device includes a first transmitter for transmitting a timing signal to the second integrated circuit device, wherein the timing signal includes a first transition and a second transition. The first integrated circuit device also includes a first delay element for delaying the data, so that the data is delayed relative to the timing signal by a first predetermined delay time. The first integrated circuit device additionally includes a second transmitter for transmitting the delayed data to the second integrated circuit device. The second integrated circuit device, which is coupled to the first integrated circuit device, includes a receiving mechanism for receiving the timing signal and the delayed data from the first integrated circuit device. The second integrated circuit device also includes a second delay element for delaying the first transition of the timing signal by a second predetermined delay time to generate a delayed version of the first transition. The second integrated circuit device additionally includes a sense circuit configured to sense the data during a time interval between the delayed version of the first transition and the second transition.

In some embodiments, the first transition is a rising edge transition and the second transition is a falling edge transition; or the first transition is a falling edge transition and the second transition is a rising edge transition.

In some embodiments, the first and second data are consecutive data.

In some embodiments, the first transmitter and the receiver are coupled through a first communication channel, and the second transmitter and the receiver are coupled through a second communication channel.

In some embodiments, the first transmitter and the second transmitter are coupled to the receiver through a common communication channel.

In some embodiments, the sensing circuit further includes a sense amplifier and an integrator circuit coupled to the sense amplifier.

In some embodiments, the output of the second delay element is coupled to the integrator circuit, while the received timing signal is coupled to the clock input of the sense amplifier.

In some embodiments, the delayed data at the second integrated circuit device includes the delayed first and second data, which are associated with a first noise band and a second noise band, respectively. Moreover, a window between the end of the first noise band and the beginning of the second noise band defines a time interval for sensing the data.

In some embodiments, the first delay element is configured to calibrate the first predetermined delay time so that the second transition substantially aligns with the beginning of the second noise band at the second integrated circuit device.

In some embodiments, while calibrating the first predetermined delay time, the integrator circuit is disabled so that the delayed data passes through the integrator circuit to the sense amplifier without integration, and the sense amplifier samples the second noise band while moving the second transition toward the beginning of the second noise band.

In some embodiments, the second delay element is configured to calibrate the second predetermined delay time so that the delayed version of the first transition substantially aligns with the end of the first noise band at the second integrated circuit device.

In some embodiments, while calibrating the second predetermined delay time, the integrator circuit integrates the delay data to maximize the integrated voltage while moving the first transition toward the end of the first noise band.

In some embodiments, the second integrated circuit device includes a windowed integrating sampler, and wherein the delayed version of the first transition and the second transition defines a sense window.

In some embodiments, the delayed version of the first transition initiates a precharge operation on the integrator circuit and second transition triggers a sensing action on the sense amplifier.

In some embodiments, the system is a source-synchronous signaling system.

In some embodiments, the received delayed data is coupled to the data input of the sense amplifier, and the output of the second delay element is coupled to the clock input of the sense amplifier.

This disclosure has described a technique for communicating data to an integrated circuit device. During operation, the integrated circuit device receives a timing signal which includes a first transition followed by a second transition. The integrated circuit device also receives the data, wherein the data is phase-offset with respect to the first transition by a predetermined phase offset. The integrated circuit device then delays the first transition of the timing signal by a predetermined delay time to generate a delayed version of the first transition. Next, the integrated circuit device senses the data at the second integrated circuit device during a time interval between the delayed version of the first transition and the second transition of the timing signal.

This disclosure has described a receiver for an integrated circuit device in a communicating system. The receiver includes (1) a first circuit for receiving a timing signal that includes a first transition followed by a second transition; (2) a second circuit for receiving data that is delayed by a first predetermined delay time with respect to the timing signal; (3) a third circuit for delaying the first transition of the timing signal by a second predetermined delay time to generate a delayed version of the first transition; and (4) a fourth circuit for sensing the data during a time interval between the delayed version of the first transition and the second transition of the timing signal.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for communicating data between a first integrated circuit device and a second integrated circuit device, the method comprising: transmitting a timing signal from the first integrated circuit device to the second integrated circuit device, wherein the timing signal includes a first transition and a second transition; delaying the data at the first integrated circuit device, so that the data is delayed relative to the timing signal by a first delay time; transmitting the delayed data from the first integrated circuit device to the second integrated circuit device; receiving the timing signal and the delayed data at the second integrated circuit device; delaying, at the second integrated circuit device, the first transition of the timing signal by a second delay time to generate a delayed version of the first transition; and sensing the data at the second integrated circuit device during a time interval between the delayed version of the first transition and the second transition using the delayed version of the first transition to start integration of the data and using the second transition as a sense edge to trigger sensing of the data.

2. The method of claim 1, wherein delaying the data at the first integrated circuit device involves:
delaying the timing signal, thereby generating a delayed timing signal; and
using the delayed timing signal to delay the data.

3. The method of claim 1, wherein delaying the first transition of the timing signal at the second integrated circuit device involves using a delay element on the second integrated circuit device to delay the timing signal.

4. The method of claim 1,
wherein transmitting the timing signal involves transmitting the timing signal via a first communication channel coupled between the first integrated circuit device and the second integrated circuit device; and
wherein transmitting the delayed data involves transmitting the delayed data via a second communication channel coupled between the first integrated circuit device and the second integrated circuit device.

5. The method of claim 1, wherein the delayed data at the second integrated circuit device is associated with a first noise band and a second noise band, wherein a window between an end of the first noise band and a beginning of the second noise band defines the time interval, and wherein the method further comprises calibrating the first delay time so that the second transition substantially aligns with the beginning of the second noise band at the second integrated circuit device.

6. The method of claim 5, wherein calibrating the first delay time involves performing sampling operations on the second noise band at the second integrated circuit device while moving the second transition toward the second noise band.

7. The method of claim 5, wherein the method further comprises calibrating the second predetermined delay time so that the delayed version of the first transition substantially aligns with the end of the first noise band at the second integrated circuit device.

8. A system, comprising: a first integrated circuit device coupled to a second integrated circuit device; the first integrated circuit device having a first transmitter configured to transmit a timing signal to the second integrated circuit device, wherein the timing signal includes a first transition and a second transition, a first delay element configured to delay the data, so that the data is delayed relative to the timing signal by a first delay time, and a second transmitter configured to transmit the delayed data to the second integrated circuit device; and the second integrated circuit having a receiving mechanism configured to receive the timing signal and the delayed data from the first integrated circuit device, a second delay element configured to delay the first transition of the timing signal by a second delay time to generate a delayed version of the first transition, and a sense circuit configured to sense the data during a time interval using the delayed version of the first transition to start integration of the data and using the second transition as a sense edge to trigger sensing of the data.

9. The system of claim 8, wherein the first transmitter and the receiving mechanism are coupled through a first communication channel, and wherein the second transmitter and the receiving mechanism are coupled through a second communication channel.

10. The system of claim 8, wherein the first transmitter and the second transmitter are coupled to the receiving mechanism through a common communication channel.

11. The system of claim 8, wherein the sense circuit further comprises:
a sense amplifier; and
an integrator circuit coupled to the sense amplifier.

12. The system of claim 11,
wherein an output of the second delay element is coupled to the integrator circuit in a manner such that the delayed version of the first transition initiates integration by the integrator circuit; and
wherein the received timing signal is coupled to the sense circuit in a manner such that the second transition triggers sensing by the sense amplifier of integration by the integrator circuit.

13. The system of claim 8, wherein the delayed data is associated with a first noise band and a second noise band, wherein a window between an end of the first noise band and a beginning of the second noise band defines the time interval that gates sensing of the data by the sense circuit, and wherein the first delay time is adapted to substantially align the second transition with the beginning of the second noise band at the second integrated circuit device.

14. The system of claim 13, wherein the second delay time is adapted to substantially align the delayed version of the first transition with the end of the first noise band at the second integrated circuit device.

15. The system of claim 8, wherein the second integrated circuit device comprises a windowed integrating sampler, and wherein the delayed version of the first transition and the second transition defines a sense window for the windowed integrating sampler.

16. The system of claim 8, wherein the delayed version of the first transition initiates a precharge release of the sense circuit and the second transition triggers a sensing action by the sense circuit.

17. The system of claim 8, wherein the system is a source-synchronous signaling system.

18. A receiver integrated circuit device adapted for use in a communicating system, comprising: a first circuit that is configured to receive a timing signal having a first transition followed by a second transition; a second circuit that is configured to receive data delayed at a transmitter by a first delay time with respect to the timing signal; a third circuit that is configured to delay the first transition of the timing signal by a second delay time to generate a delayed version of the first transition; and a fourth circuit that is configured to integrate a voltage representing a bit of the data during a window using the delayed version of the first transition to start integration of the data and using the second transition as a sense edge to trigger sensing of the data.

19. The integrated circuit receiver of claim 18, wherein the second delay time is adapted to time a precharge release of the integrating circuit to match the end of a first noise band which precedes the window.

20. The integrated circuit receiver of claim 18, wherein the first predetermined delay time is adapted to time a sense interval of the fourth circuit to match the beginning of a second a first noise band which follows the window.

21. The integrated circuit receiver of claim 18, embodied as a memory device.

22. The integrated circuit receiver of claim 18, wherein the timing signal includes a third transition which follows the second transition, wherein the integrated circuit receiver is embodied as a multi-data rate integrated circuit, and wherein the fourth circuit is configured to sense a first phase of the data during the time interval between the delayed version of the first transition and the second transition, and to sense a second phase of the data between a delayed version of the second transition and the third transition.

23. The integrated circuit receiver of claim 18, embodied as a memory controller.

24. The integrated circuit receiver of claim 18, wherein the data is received by the integrated circuit receiver and is delayed with respect to the timing signal prior to being received by the integrated circuit receiver.

25. A method of operating a receiver integrated circuit device in a communicating system, comprising: receiving a timing signal that includes a first transition followed by a second transition; receiving data delayed at a transmitter by a first delay time with respect to the timing signal; delaying the first transition of the timing signal by a second delay time to generate a delayed version of the first transition; and sensing the data during a time interval between the delayed version of the first transition and the second transition; wherein sensing includes using circuitry of the receiver integrated circuit to integrate and sense voltage associated with a bit of the data using the delayed version of the first transition to start integration of the data and using the second transition as a sense edge to trigger sensing of the data.

26. The method of claim 25, wherein the second delay time is adapted to time a start of the window to correspond to the end of a first noise band which immediately precedes each bit of the data.

27. The method of claim 26, wherein the first predetermined delay time is adapted to time an end of the window to match the beginning of a second first noise band which immediately follows each bit of the data.

28. The method of claim 25, embodied as a method of operating a memory device.

29. The method of claim 25, wherein the timing signal includes a third transition which follows the second transition, wherein the receiver integrated circuit device is adapted to use multi-data rate signaling, and wherein sensing includes sensing a first phase of the data during the time interval between the delayed version of the first transition and the second transition, and sending a second phase of the data between a delayed version of the second transition and the third transition.

30. The method of claim 25, embodied as a method of operating a memory controller.

31. The method of claim 25, wherein receiving the data includes receiving the data in a manner that is delayed with respect to the timing signal prior to being received by the receiver integrated circuit device.

* * * * *